United States Patent [19]

Hulsebusch et al.

[11] Patent Number: 4,547,920

[45] Date of Patent: Oct. 22, 1985

[54] PROCESS FOR DEVELOPING POROSITY IN AIR IMPERVIOUS FILM AND ARTICLES PRODUCED BY THE PROCESS

[75] Inventors: William H. Hulsebusch, Dewitt; Lysle R. Hinkhouse, Wilton, both of Iowa

[73] Assignee: Sears Manufacturing Company, Davenport, Iowa

[21] Appl. No.: 543,500

[22] Filed: Oct. 19, 1983

[51] Int. Cl.⁴ .................. A47C 27/14; B29D 27/04
[52] U.S. Cl. .......................... 5/468; 5/481; 264/46.8; 264/101; 264/156; 297/256; 297/DIG. 1
[58] Field of Search .......... 264/46.8, 156, 101; 5/481, 468; 297/455, 456, DIG. 1

[56] References Cited

U.S. PATENT DOCUMENTS

| | | | |
|---|---|---|---|
| 2,689,379 | 9/1954 | Nissel | 264/154 |
| 3,012,918 | 12/1961 | Schaar | 264/156 X |
| 3,073,304 | 1/1963 | Schaar | 264/156 X |
| 3,092,439 | 6/1963 | Harrison | 264/156 X |
| 3,258,511 | 6/1966 | McGregor, Jr. | 264/46.4 |
| 3,331,089 | 7/1967 | Ornas, Jr. et al. | 5/468 X |
| 3,431,331 | 3/1969 | Pincus et al. | 264/46.8 X |
| 3,566,726 | 3/1971 | Politis | 264/156 X |
| 3,587,459 | 6/1971 | Spencer et al. | 264/156 X |
| 3,589,967 | 6/1971 | Shirakawa | 264/46.8 X |
| 3,932,252 | 1/1976 | Woods | 264/46.4 |
| 4,247,348 | 1/1981 | Lischer | 264/46.8 X |
| 4,264,386 | 4/1981 | Sears, Jr. et al. | 264/46.8 X |
| 4,377,609 | 3/1983 | Bartoli | 428/71 |

Primary Examiner—Philip Anderson
Attorney, Agent, or Firm—Niro, Scavone, Haller & Niro, Ltd.

[57] ABSTRACT

A process for developing porosity in air impervious film. The process is disclosed for fabricating a cushion article having a cover provided with increased air flow capabilities. A covering is provided for a cushion body, the covering including a laminated film and, preferably, an outer fabric layer. The film includes a first layer having a relatively high temperature melting point and a second layer having a relatively low temperature melting point. The first layer includes perforations, and the second layer is continuous and air impervious. The laminated film is heated at a temperature which approaches or is above the melting temperature of the second layer but below the melting temperature of the first layer to melt the second layer at least in areas coincident with the perforations in the first layer to form air flow passages through the film laminate.

16 Claims, 4 Drawing Figures

PROCESS FOR DEVELOPING POROSITY IN AIR IMPERVIOUS FILM AND ARTICLES PRODUCED BY THE PROCESS

BACKGROUND OF THE INVENTION

This invention relates generally to a method of developing porosity in an air impervious film or laminate. The invention further relates to a cushion article and a process for fabricating the article with a cover having increased air flow capabilities.

One area in which the invention has particular applicability is in the art of fabricating cushion articles. Traditional methods of making upholstered seat cushions, for instance, have involved (1) cutting the cover material according to an appropriate pattern; (2) sewing the cut material; and (3) stuffing the cushion. High labor costs result since, in many instances, the cutting and sewing operations are extensive and most often are performed by hand.

To reduce the costs of manufacturing seat cushions, a molding process was devised for manufacturing seat cushions comprising a foam portion having an integral vinyl cover. The vinyl cover first is heated and then drawn into a cold mold by means of a vacuum between the vinyl and the mold. As the vinyl cools, it assumes the contours of the mold. Foam then is poured into the mold to form the foam portion of the seat cushion. This process significantly reduces manufacturing costs and results in a superior seat.

However, cloth has many advantages over vinyl. Specifically, cloth is water vapor permeable. Perspiration that normally collects behind a person sitting in a vinyl seat can evaporate through cloth so that cloth covered cushions feel cooler during warm weather and warmer during cold weather. Furthermore, the feel of cloth is much more luxurious and elegant.

In recognition of these advantages, a novel molding process was devised for manufacturing seat cushions comprising a foam portion having an integral cover including an outer cloth layer. Such a process is disclosed in U.S. Pat. Nos. 4,247,348 and 4,264,386. In that process the stitch of the fabric layer in set in the mold. This may be accomplished by employing a mold heated to at least the fabric temperature when the cloth is drawn into the mold. The fabric layer is thereby heated and then allowed to cool. By this process the fabric stitch is set and the cloth is formed to the precise contours of the mold. Foam then is poured into the mold after the cooling step to form an integral seat cushion with a fabric cover. The fabric normally is bonded or laminated to a vinyl film to permit the cover to be vacuum drawn into the mold.

All of the above innovations in the art have resulted in labor savings and improved products. Yet, one of the problems remaining with making seat cushions or other cushion articles by the above process is insufficient air flow through the covering. As stated above, cloth has an advantage over vinyl in that the cloth is water vapor permeable. However, when the cloth is laminated to a vinyl layer to permit vacuum drawing of the laminated cover into the mold, the cloth loses much of its air flow capabilities. In certain fields, such as the automotive industry, this air flow capability is called "breathability".

A common method of providing breathability in covered cushion articles is illustrated in U.S. Pat. No. 3,258,511 to McGregor, dated June 28, 1966. In that patent, a cushion article has a cloth cover laminated to an air impervious film. After the cushion article is fabricated, the cover is punctured by a roller having needle-like projections. One of the problems in puncturing a vinyl backed cloth cover is that the projections have a tendency to break the yarn of the fabric, thereby diminishing the durability and appearance of the upholstered cushion.

The present invention contemplates solving these problems by a novel method of developing porosity in an otherwise air impervious film or laminate, thereby providing increased air flow capabilities in such items as cushion articles, particularly articles which include a cover comprising a portion thereof fabricated of air impervious film.

SUMMARY OF THE INVENTION

An object, therefore, of the present invention is to provide a process for developing porosity in air impervious films or laminates.

Another object of the invention is to provide a process for fabricating a cushion article having a cover provided with increased air flow capabilities.

A further object of the invention is to provide a cushion article, such as a seat cushion or the like, fabricated in accordance with the process of the invention.

The invention contemplates a process for developing porosity in an otherwise air impervious film. The process includes providing a laminated film having two or more layers, including a first layer with a relatively high temperature melting point and a second layer with a relatively low temperature melting point. The first layer includes perforations therein and at least the second layer is air impervious. The laminated film is heated to a temperature which approaches or is above the melting temperature of the second layer but below the melting temperature of the first layer to thereby melt the second layer at least in the areas coincident with the perforations in the first layer to form air flow passages through the film.

Preferably, the laminated film is of thermoplastic material and the melting point of the second layer is below the softening point of the first layer. A pressure differential may also be applied across the laminated film during the heating step.

In the exemplary embodiment of the invention, the process is used in fabricating a cushion article which includes a cushion body in the shape of the article. A covering is provided for at least part of the cushion body. The covering includes a laminated film comprising at least first layer having a relatively high temperature melting point and a second layer having a relatively low temperature melting point. The first layer has perforations, and the second layer is continuous. Both layers are air impervious, with the exception of the perforations in the first layer, and are preferably fabricated of thermoplastic material. The laminated film then is heated to a temperature which approaches or is above the melting temperature of the second layer but well below the melting temperature of the first layer. In this manner, holes are formed in the second layer by melting the second layer at least in areas coincident with the perforations in the first layer to form air passages through the film and, thus, the covering for the cushion article.

In the preferred embodiment, the cover is provided with an outer fabric layer bonded to the outside of the laminated film.

The process of the present invention and the article produced by the process are readily applicable for fabricating seat cushions or the like. As disclosed herein, a mold is provided having the shape of a desired seat cushion. The laminated covering, including the outer fabric layer and the above described first and second film layers, is vacuum drawn into the mold. Foam then is poured into the mold and at least partially cured to form the seat cushion. The covering then is heated to melt portions of the second layer to create air passages through the film as described above, resulting in increased air flow or "breathability" for the cushion. With this process of vacuum drawing the covering into the mold and curing the foam in the mold, vacuum can be applied from a single source for drawing the cover into the mold and for establishing the pressure differential across the laminate during heating of the covering to melt the second layer and create the desired air flow perforations. The heat required for or generated by the foam curing process may also serve to heat the covering and thereby melt the second layer of the film laminate.

It should be understood that the invention is not limited in its applicability to seat cushions. A wide range of applications are contemplated, such as in fabricating acoustical panels, automobile headliners, and many other areas.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

The invention contemplates a novel method or process for developing porosity in otherwise air impervious film. In carrying out the invention, the air impervious nature of the film is utilized for a given purpose, whereafter it is desirable to develop porosity in the film to create air flow passages therethrough. The drawings and the following description exemplify a use of the invention in fabricating cushion articles, such as seat cushions or the like. However, the invention has far reaching utility in a wide range of other applications.

Figure 1:
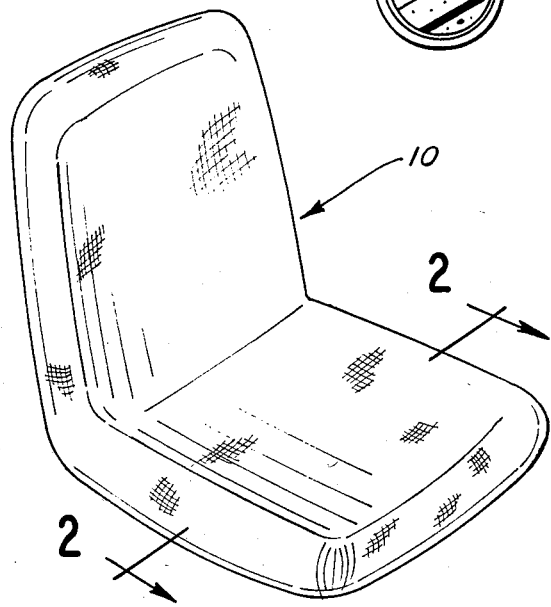
FIG. 1 is a perspective view of a cushion article in the form of a seat cushion incorporating the invention.

Referring to the drawings in greater detail, and first to FIG. 1, the invention is illustrated for use in molding a cushion article, such as a seat cushion generally designated 10, which can be used in countless applications, as in the automotive industry.

Figure 2:
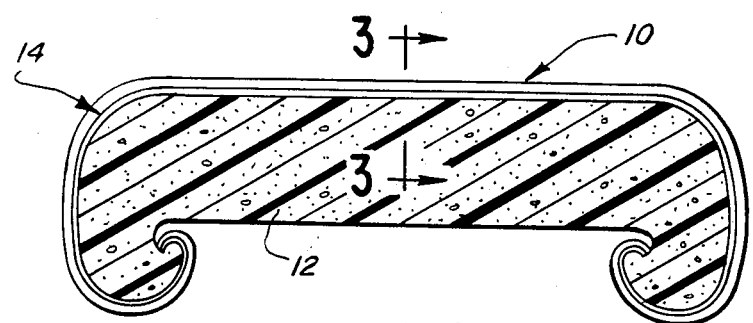
FIG. 2 is a sectional view, on an enlarged scale, through the seat cushion taken generally along line 2—2 of FIG. 1.

FIG. 2 illustrates a sectional view through seat cushion 10 to show that the cushion generally includes a foam cushion body 12 substantially surrounded by a covering, generally designated 14.

Figure 3:
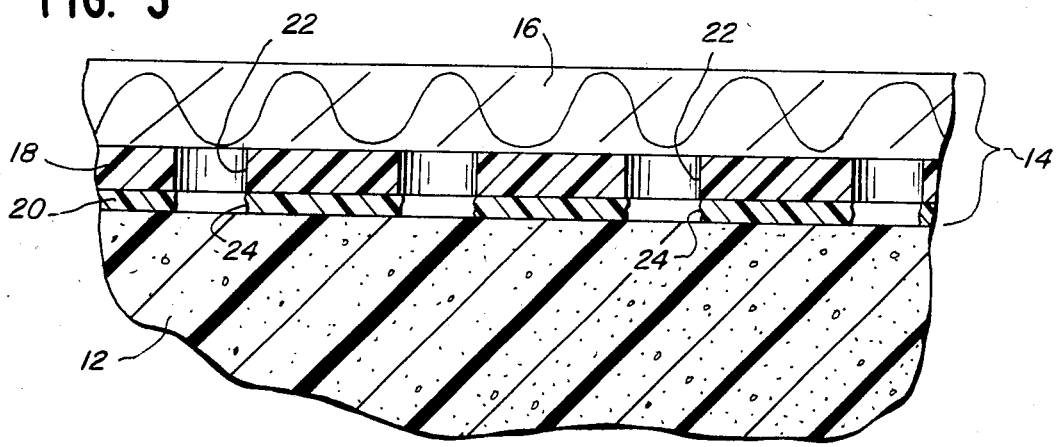
FIG. 3 is a fragmented sectional view, on a further enlarged scale, through the seat cushion, taken along line 3—3 of FIG. 2, and illustrating the laminated cover of the invention.

FIG. 3 illustrates that covering 14 is a laminated cover comprising an outer fabric layer 16, a first film layer 18 bonded to the fabric layer and a second film layer 20 laminated to first film layer 18. Preferably, the laminated film, comprising first layer 18 and second layer 20, is fabricated from an air impervious thermoplastic material. It should be understood that the laminated cover can be either multiple layered plastic film, layered film with a cloth layer, or including an open-cell foam layer between the layered film and the cloth layer.

In accordance with the invention, first film layer 18 has a relatively high temperature melting point, and second film layer 20 has a relatively low temperature melting point. Although the first layer is illustrated in the drawings as thicker than the second layer, the relative thickness of the first and second layers will depend upon the particular materials from which they are fabricated and the application or use of the laminates.

Figure 4:
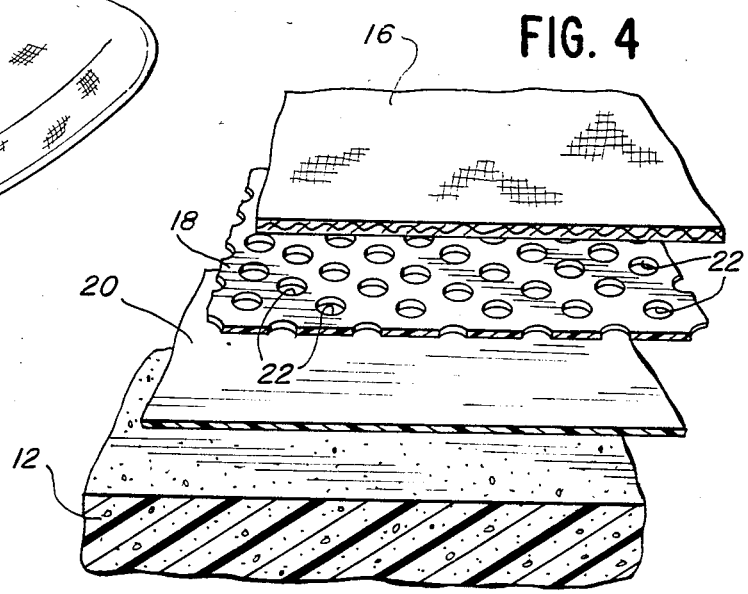
FIG. 4 is an exploded perspective view of the various components of the laminated cover of the invention.

As seen in FIGS. 3 and 4, the first or high temperature film 18 is provided with perforations 22. At this point, it should be noted that the perforations can be formed in film layer 18 in convenient manner and in any type of pattern commensurate with the desired use of the seat cushion. For instance, it may be desirable to provide air flow in only certain selected areas of a seat cushion.

In carrying out the invention, a process is provided for fabricating a cushion article, such as seat cushion 10 or the like, having a cover provided with increased air flow capabilities. A mold is provided having the shape of a desired seat cushion. An example of such a mold is disclosed in copending application Ser. No. 511,497, filed July 7, 1983 and now U.S. Pat. No. 4,501,541, which is a continuation-in-part of application Ser. No. 418,395, filed Sept. 15, 1982, both of which are incorporated herein by reference. Covering 14 first is provided for the seat cushion. The covering includes outer fabric layer 16 bonded integrally to the inner laminated film. The film includes first layer 18 having the relatively high temperature melting point and second layer 20 having the relatively low temperature melting point. First layer 18 is provided with perforations 22. Preferably, both layers of the laminated film are fabricated from an air impervious plastic material. The covering then is vacuum drawn into the mold to conform to the interior shape thereof. A form forming material then is poured into the mold and at least partially cured to form the cushion body 12 integral with the covering 14. The laminated film then is heated to a temperature which approaches or is above the melting temperature of film layer 20 but below the high melting temperature of film layer 18 to melt at least portions of film layer 20 coincident with perforations 22, thereby forming air flow passages through the covering.

In practice, it is preferable to use a laminated film in which the melting point of the second layer is below the softening point of the first layer. For example, first and second layers have been used of equal 2.0 mil thickness with the melting point of the second layer being about 275° F. and the softening point of the first layer being about 300° F. The film laminate is then heated to approximately 275°.

Preferably, a pressure differential is established across the laminated film during the heating step to facilitate forming air passages 24 (FIG. 3) through film layer 20 in alignment with perforations 22. For instance, vacuum can be applied from a single source for drawing the covering into the mold as well as for application during the heating step to melt film layer 20.

It should be noted that the term "laminated" herein is not intended to be limited to a covering or film wherein the various layers are bonded or fixed to one another. An integral or bonded lamination has proven effective but the term "laminated" should not be construed as so limited in the specification and claims herein.

Thus, it can be seen that a novel process and article have been provided for forming a cushion article having a cover and wherein the article is provided with increased air flow capabilities. The covering for the cushion begins as an air impervious laminate and ends up as a structure providing air flow comfort in areas that can be controlled as desired. Furthermore, the development of porosity in the film can be carried out simultaneously or during the actual process of molding the cushion article itself. No extraneous steps are necessary subsequent to formation of the cushion article.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A molded seat cushion or the like which has a cover provided with air flow capabilities, comprising:
   a foam body molded in the shape of a desired seat cushion; and a covering for the foam body including an outer fabric layer and an inner laminated film; the film including a first layer which is air impervious with the exception of perforations therein, and a second air impervious layer having air passages coincident with the perforations of the first layer, the air passages in the second layer having been formed by melting selected portions of the second layer.

2. A process for developing porosity in air impervious film, comprising the steps of:
   providing a laminated film having at least two layers, including a first layer having a relatively high temperature melting point and a second layer having a relatively low temperature melting point, the first layer also having perforations therein and at least the second layer being air impervious; and
   heating the laminated film a temperature which approaches or is above said low temperature melting point of the second layer but below said high temperature melting point of the first layer to form holes in the second layer at least in areas coincident with said perforations in the first layer to form air flow passages through the film.

3. The process of claim 2, including the step of applying a pressure differential across the laminated film during said heating step.

4. A process for developing porosity in air impervious film, comprising the steps of:
   providing a laminated film which includes a first layer having perforations therein and a second layer that is air impervious, the melting point of the second layer being less than the softening point of the first layer; and
   heating the laminated film to a temperature which approaches or is above the melting point of the second layer but below the softening point of the first layer to form holes in the second layer at least in areas coincident with said perforations in the first layer to form air flow passages through the film.

5. The process of claim 4, including the step of applying a pressure differential across the laminated film during said heating step.

6. A process for fabricating a cushion article having a cover provided with air flow capabilities, comprising the steps of:
   providing a cushion body;
   providing a covering for at least part of the cushion body, the covering including a laminated film comprising a first layer having a relatively high temperature melting point and including perforations therein, and a second layer having a relatively low temperature melting point, at least the second layer being air impervious;
   placing said covering over the cushion body; and
   heating the laminated film to a temperature which approaches or is above said low temperature melting point of the second layer but below said high temperature melting point of the first layer to form holes in the second layer at least in areas coincident with said perforations in the first layer to form air flow passages through the film.

7. The process of claim 6, including the step of applying vacuum to one side of the film during said heating step to aid in forming the holes in said second layer.

8. The process of claim 6 wherein said cover is provided with an outer fabric layer on the outside of said laminated film.

9. The process of claim 6 wherein both said layers of the laminated film are plastic material.

10. A process for fabricating a cushion article having a cover provided with air flow capabilities, comprising the steps of:
    providing a mold having the shape of the desired cushion article;
    providing a covering for at least part of the cushion article, the covering including a laminated film comprising a first layer having a relatively high temperature melting point, the first layer including perforations therein, and a second layer having a relatively low temperature melting point, at least the second layer being air impervious;
    vacuum drawing the covering into the mold;
    pouring a settable foaming material into the mold and at least partially curing the foaming material to form a cushion body within said covering; and
    heating the covering to a temperature which approaches or is above said low temperature melting point of the second layer but below said high temperature melting point of the first layer to form holes in the second layer at least in areas coincident with said performations in the first layer to form air flow passages through the covering.

11. The process of claim 10 wherein vacuum is applied to one side of the covering during said heating step.

12. The process of claim 10 wherein said covering includes an outer fabric layer on the outside of said laminated film.

13. The process of claim 10 wherein both said layers of the laminated film are plastic material.

14. A process for fabricating a seat cushion or the like having a cover provided with air flow capabilities, comprising the steps of:
   providing a mold having the shape of a desired seat cushion;
   providing a covering for the seat cushion, the covering including an outer fabric layer bonded to an inner laminated film, the film including a first layer having a relatively high temperature melting point, the first layer including perforations therein, and a second air impervious layer having a relatively low temperature melting point;
   vacuum drawing the covering into the mold;
   pouring a settable foaming material into the mold and at least partiallycuring the foaming material to form a cushion body within the covering; and
   heating the covering to a temperature which approaches or is above said low temperature melting point of the second layer but below said high temperature melting point of the first layer to form holes in the second layer at least in areas coincident with said perforations in the first layer to form air flow passages through the covering.

15. The process of claim 13 wherein vacuum is applied to one side of the covering during said heating step.

16. The process of claim 14 wherein vacuum is applied from a single source for drawing the cover into the mold and for application during said heating step.

* * * * *